(12) United States Patent
Honda et al.

(10) Patent No.: US 12,326,137 B2
(45) Date of Patent: Jun. 10, 2025

(54) ABNORMALITY DETERMINATION METHOD FOR WIND POWER GENERATION DEVICE, ABNORMALITY DETERMINATION SYSTEM FOR WIND POWER GENERATION DEVICE, AND ABNORMALITY DETERMINATION PROGRAM FOR WIND POWER GENERATION DEVICE

(71) Applicant: FUDO GIKEN INDUSTRY CO., LTD., Nagasaki (JP)

(72) Inventors: Iwao Honda, Nagasaki (JP); Hirofumi Nakamura, Nagasaki (JP); Masami Matsuura, Nagasaki (JP)

(73) Assignee: FUDO GIKEN INDUSTRY CO., LTD., Nagasaki (JP)

( * ) Notice: Subject to any disclaimer, the term of this patent is extended or adjusted under 35 U.S.C. 154(b) by 207 days.

(21) Appl. No.: 18/021,893

(22) PCT Filed: Aug. 10, 2021

(86) PCT No.: PCT/JP2021/029471
§ 371 (c)(1),
(2) Date: Feb. 17, 2023

(87) PCT Pub. No.: WO2022/054483
PCT Pub. Date: Mar. 17, 2022

(65) Prior Publication Data
US 2023/0366382 A1  Nov. 16, 2023

(30) Foreign Application Priority Data

Sep. 11, 2020 (JP) ................. 2020-153152

(51) Int. Cl.
*F03D 17/00* (2016.01)

(52) U.S. Cl.
CPC ....... *F03D 17/013* (2023.08); *F03D 17/0065* (2023.08); *F03D 17/024* (2023.08); *F03D 17/028* (2023.08); *F05B 2260/80* (2013.01)

(58) Field of Classification Search
CPC .. F03D 17/013; F03D 17/024; F03D 17/0065; F05B 2260/80
See application file for complete search history.

(56) References Cited

U.S. PATENT DOCUMENTS

| 9,395,337 B2 | 7/2016 | Newman |
| 2014/0278151 A1 | 9/2014 | Newman |
| 2016/0033580 A1 | 2/2016 | Qiao et al. |

FOREIGN PATENT DOCUMENTS

| JP | 2010-281279 | 12/2010 |
| JP | 2010281279 A * | 12/2010 |

(Continued)

OTHER PUBLICATIONS

International Search Report for PCT/JP2021/029471 dated Sep. 7, 2021.

*Primary Examiner* — Brian P Wolcott
*Assistant Examiner* — John S Hunter, Jr.
(74) *Attorney, Agent, or Firm* — Stephen J Weyer, Esq.; Stites & Harbison, PLLC (57) ABSTRACT

An abnormality determination method for a wind power generation device includes: a measurement step (step S1) of measuring sound emitted by the wind power generation device and recording acoustic data; an analysis step (step S2) of performing a spectrogram analysis on the acoustic data recorded in the measurement step, on a frequency axis and in a temporal axis space as a temporal change in a frequency characteristic by using the short-time Fourier transform or the wavelet transform; a detection step (step S3) of detecting, from the analysis result in the analysis step, a signal component emitted from an abnormal portion of the (Continued)

wind power generation device in a time corresponding to rotation of the wind power generation device; and a determination step (step S5) of determining that the wind power generation device is abnormal when the signal component detected in the detection step is greater than or equal to a certain threshold value.

11 Claims, 10 Drawing Sheets

(56) References Cited

FOREIGN PATENT DOCUMENTS

| | | | |
|---|---|---|---|
| JP | A-2010281279 | | 12/2010 |
| JP | 2013-185507 | | 9/2013 |
| JP | A-2013185507 | | 9/2013 |
| JP | 2016519292 A | * | 6/2016 |
| JP | A-2016519292 | | 6/2016 |

* cited by examiner

ABNORMALITY DETERMINATION METHOD FOR WIND POWER GENERATION DEVICE, ABNORMALITY DETERMINATION SYSTEM FOR WIND POWER GENERATION DEVICE, AND ABNORMALITY DETERMINATION PROGRAM FOR WIND POWER GENERATION DEVICE

TECHNICAL FIELD

The present invention relates to an abnormality determination method, an abnormality determination system, and an abnormality determination program for a wind power generation device such as a wind turbine that determine an abnormality of the wind power generation device.

BACKGROUND ART

Abnormal states of a wind power generation device may be classified into wear states caused by wear of a sliding part such as a shaft, a speed-up gear, a generator, a yaw controller, or a pitch controller, and sudden states caused by a lightning strike or the like.

Minor damage generated in a sliding part and slight damage generated in a blade or the like due to a lightning strike, a creature, or a flying object are less likely to be immediately magnified and to cause fatal damage. However, through detection at a stage where the extent of damage is small and by repairing the damage, the stoppage time of the wind power generation device can be shortened, thereby minimizing losses in profits from electricity sales.

In particular, when a blade is damaged and needs to be replaced, a large crane or the like is required, and the stoppage time may be long. A prolonged stoppage time leads to substantial losses in profits from electricity sales, and thus an operator who is most intent on avoiding losses has a great need to detect the damage while still insignificant.

In the future, the number of wind power generation devices installed not only on land but also offshore is expected to increase, and larger wind power generation devices are anticipated. In the case of large-scale offshore wind power, it takes time to deploy and return a crane ship, and prolonged stoppage times due to repairs are to be expected as abnormality detection becomes increasingly important.

Consequently, various proposals have been made for the detection of abnormal states of wind power generation devices.

Patent Literature 1 discloses a wind-turbine blade breakage detection device in which a vibration sensor is installed on each blade of a wind turbine, and failure is determined by analyzing vibrations outputted from the vibration sensor, and proposes that, when an abnormality is generated in the wind turbine blade, a minute abnormality can be detected at the stage of an initial abnormality, thus preventing a breakage and scattering incident of the wind turbine blade.

In addition, Patent Literature 2 proposes that a plurality of acceleration sensors are installed in mechanical equipment, and that vibration is detected and analyzed to accurately diagnose the presence or absence of an abnormality and specify an abnormal portion.

Furthermore, Patent Literature 3 proposes that an abnormality of a blade is determined by measuring sound below the blade and detecting the Doppler shift component from the analysis result, whereby the abnormality of the blade is detected early and reliably at low cost without requiring the skills of an operator.

CITATION LIST

Patent Literatures

Patent Literature 1: JP 2001-349775 A
Patent Literature 2: JP 2009-20090 A
Patent Literature 3: JP 5207074 B2

SUMMARY OF INVENTION

Technical Problem

However, in the methods disclosed in Patent Literature 1 and Patent Literature 2 according to which an abnormality is detected by measuring and analyzing vibrations, it is necessary to install a plurality of vibration sensors (for example, for all blades and all sliding parts, respectively), and there is a problem in that analysis becomes complicated and it is difficult to pinpoint where an abnormality has occurred. Furthermore, there is also a problem in that the entire system tends to be expensive.

In addition, in the method of Patent Literature 3, because acoustic measurement and analysis are performed below the blade and a Doppler shift component thereof is detected, there is a problem in that an abnormality of the blade can be detected but it is not possible to detect an abnormality in the nacelle. Further, because the acoustic measurement under the blade needs to be performed outdoors, it is difficult to install a measuring instrument outdoors to perform measurement continuously, and there is also a problem in that detection sensitivity becomes low using an all-weather, waterproof-type measuring instrument. Furthermore, in order to detect the Doppler shift component, it is necessary to repeat the approach and the separation of a defective part, and the detection sensitivity decreases when the distance between the approach and the separation decreases. If the measuring instrument is installed in a location where wind and rain can be avoided in the vicinity of the nacelle for continuous monitoring, there is also a problem in that the Doppler shift component decreases because the distance between the approach and the separation of the defective part decreases, and the detection sensitivity is reduced. In addition, there is also a problem that adaptation to wind turbines other than propeller-type wind turbines is difficult.

As described above, in order to efficiently operate and run a wind power generation device, it is required to detect an abnormality of the wind power generation device at an early stage when a defect is minute. Furthermore, when the amount of wind power generation introduced increases in the future, it is foreseeable that human resources for maintenance will be insufficient, and it will be a necessity for knowledge (implicit knowledge) of an expert to be inherited as formal knowledge, and for even non-expert human resources to be able to detect an abnormality.

Therefore, the present invention has been conceived in view of such problems, and an object of the present invention is to provide an abnormality determination method for a wind power generation device that enables an abnormality of the wind power generation device to be detected at an early stage and that enables reliable detection of an abnormality of the wind power generation device even by a non-expert.

Solution to Problem

In order to solve the above problems, an abnormality determination method for a wind power generation device according to the present invention includes: a measurement step of measuring sound emitted by the wind power generation device and recording acoustic data; an analysis step of performing a spectrogram analysis on the acoustic data recorded in the measurement step, on a frequency axis and in a temporal axis space as a temporal change in a frequency characteristic by using the short-time Fourier transform or the wavelet transform; a detection step of detecting, from the analysis result in the analysis step, a signal component emitted from an abnormal portion of the wind power generation device in a time corresponding to rotation of the wind power generation device; and a determination step of determining that the wind power generation device is abnormal when the signal component detected in the detection step is greater than or equal to a certain threshold value.

Due to this configuration, the presence or absence of an abnormality is determined by measuring sound emitted by the wind power generation device, performing spectrogram analysis on the corresponding acoustic data on a frequency axis and in a temporal axis space as a temporal change in a frequency characteristic, and detecting a signal component emitted from a portion where a defect is generated in a time corresponding to rotation of the wind power generation device. Therefore, an abnormality of the wind power generation device can be detected at an early stage, and an abnormality of the wind power generation device can be reliably detected even by a non-expert.

Here, in the analysis step, a spectrogram analysis is performed on deviation data from a time-averaged spectrum of the recorded acoustic data.

In addition, the fast Fourier transform may be implemented after performing the spectrogram analysis in the analysis step, and, in the detection step, a signal component emitted from an abnormal portion of the wind power generation device with a frequency corresponding to the rotation speed of the wind power generation device may be detected from an analysis result after implementing the fast Fourier transform.

Due to this configuration, the operation noise of the motor or the like of the wind power generation device is eliminated, thus enabling detection of only the abnormal sound.

In addition, the present invention can also be configured as an abnormality determination system for a wind power generation device, including: measurement means that measures sound emitted by the wind power generation device and records acoustic data; analysis means that performs spectrogram analysis on the recorded acoustic data on a frequency axis and in a temporal axis space as a temporal change in a frequency characteristic by using the short-time Fourier transform or the wavelet transform; a detection means that detects, from the analysis result of the analysis means, a signal component emitted from an abnormal portion of the wind power generation device in a time corresponding to rotation of the wind power generation device; and determination means that determines that the wind power generation device is abnormal when the signal component detected by the detection means is greater than or equal to a certain threshold value.

Furthermore, the present invention can be configured as a program for an abnormality determination device in an abnormality determination system for a wind power generation device that causes a computer to execute: a measurement step of measuring sound emitted by the wind power generation device and recording acoustic data; an analysis step of performing a spectrogram analysis on the acoustic data recorded in the measurement step, on a frequency axis and in a temporal axis space as a temporal change in a frequency characteristic by using the short-time Fourier transform or the wavelet transform; a detection step of detecting, from the analysis result in the analysis step, a signal component emitted from an abnormal portion of the wind power generation device in a time corresponding to rotation of the wind power generation device; and a determination step of determining that the wind power generation device is abnormal when the signal component detected in the detection step is greater than or equal to a certain threshold value.

Advantageous Effects of Invention

As described above, the abnormality determination method for a wind power generation device according to the present invention affords the advantageous effects of enabling an abnormality of the wind power generation device to be detected at an early stage and of enabling reliable detection of an abnormality of the wind power generation device even by a non-expert.

DESCRIPTION OF EMBODIMENTS

Hereinafter, an abnormality determination method for a wind power generation device according to the present invention will be described based on an embodiment.

Figure 1:
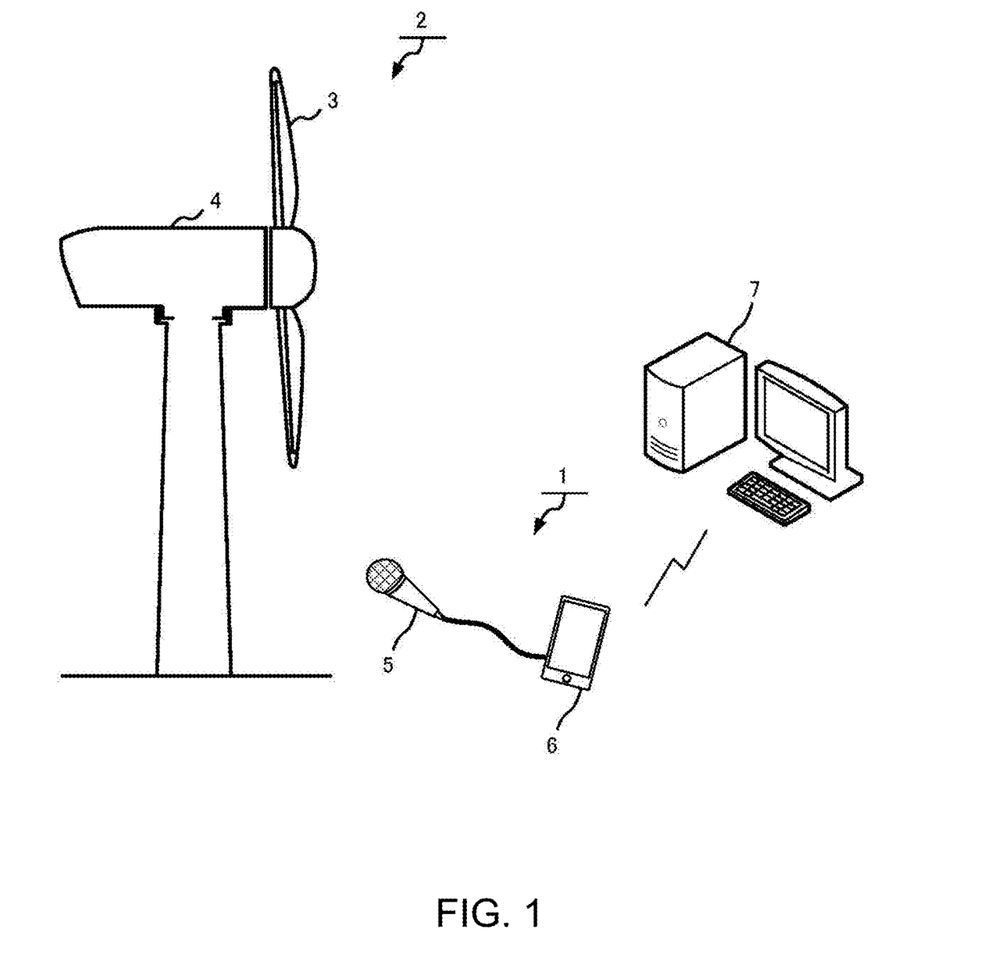
FIG. 1 is a diagram illustrating a configuration of an abnormality determination system for a wind power generation device according to an embodiment of the present invention.

FIG. 1 is a diagram illustrating a configuration of an abnormality determination system of a wind power generation device according to an embodiment of the present invention.

An abnormality determination system 1 is a system that determines an abnormal state of the wind power generation device 2 based on the sound generated by the wind power generation device 2, and is equipped with a microphone 5 that measures the sound generated by the wind power generation device 2, and an abnormality determination device 6 that acquires the sound measured by the microphone 5 and determines the abnormal state of the wind power generation device 2. The abnormality determination device 6 is connected to a remote monitoring device 7 for remotely monitoring an operation status or the like of the wind power generation device 2 via the Internet or the like, and notifies the remote monitoring device 7 of an abnormal state or the like of the wind power generation device 2.

The wind power generation device 2 is, for example, a wind turbine, and is configured by assembling, on a tower, a blade 3 that rotates by receiving wind and a nacelle 4 for changing the direction of the horizontal axis of the device according to the wind direction.

Figure 2:
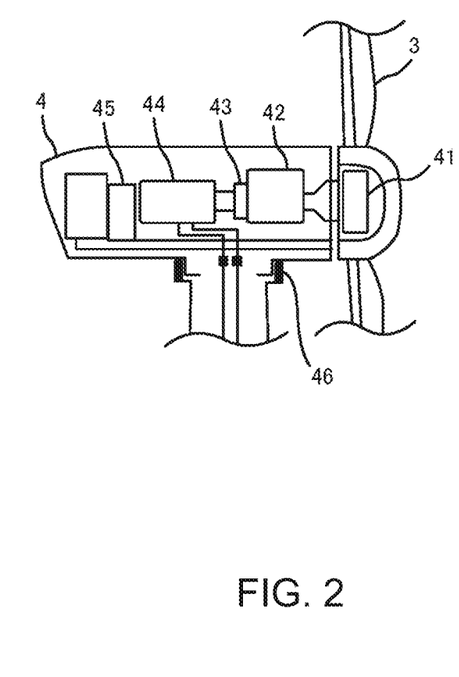
FIG. 2 is a diagram schematically illustrating structures in the vicinity of a nacelle of the wind power generation device and in the nacelle.

FIG. 2 is a diagram schematically illustrating structures in the vicinity of the nacelle of the wind power generation device and in the nacelle.

Provided inside the nacelle 4 are: a speed booster 42 that amplifies the rotation of the blade 3 to a rotation speed necessary for power generation, a brake device 43 for braking the rotation of the blade 3, a generator 44 that rotates the rotor to generate power, and a control and power-supply hydraulic device 45 for controlling the speed booster, the brake device, and the generator. In addition, the wind power generation device 2 is equipped with a variable pitch mechanism 41 that adjusts the angle of the blade 3 according to the strength of the wind at the connection between the blade 3 and the hub, and is equipped with a yaw drive mechanism 46 that causes the connection between the nacelle 4 and the tower to turn in the direction of the horizontal axis of the device according to the wind direction.

Figure 3:
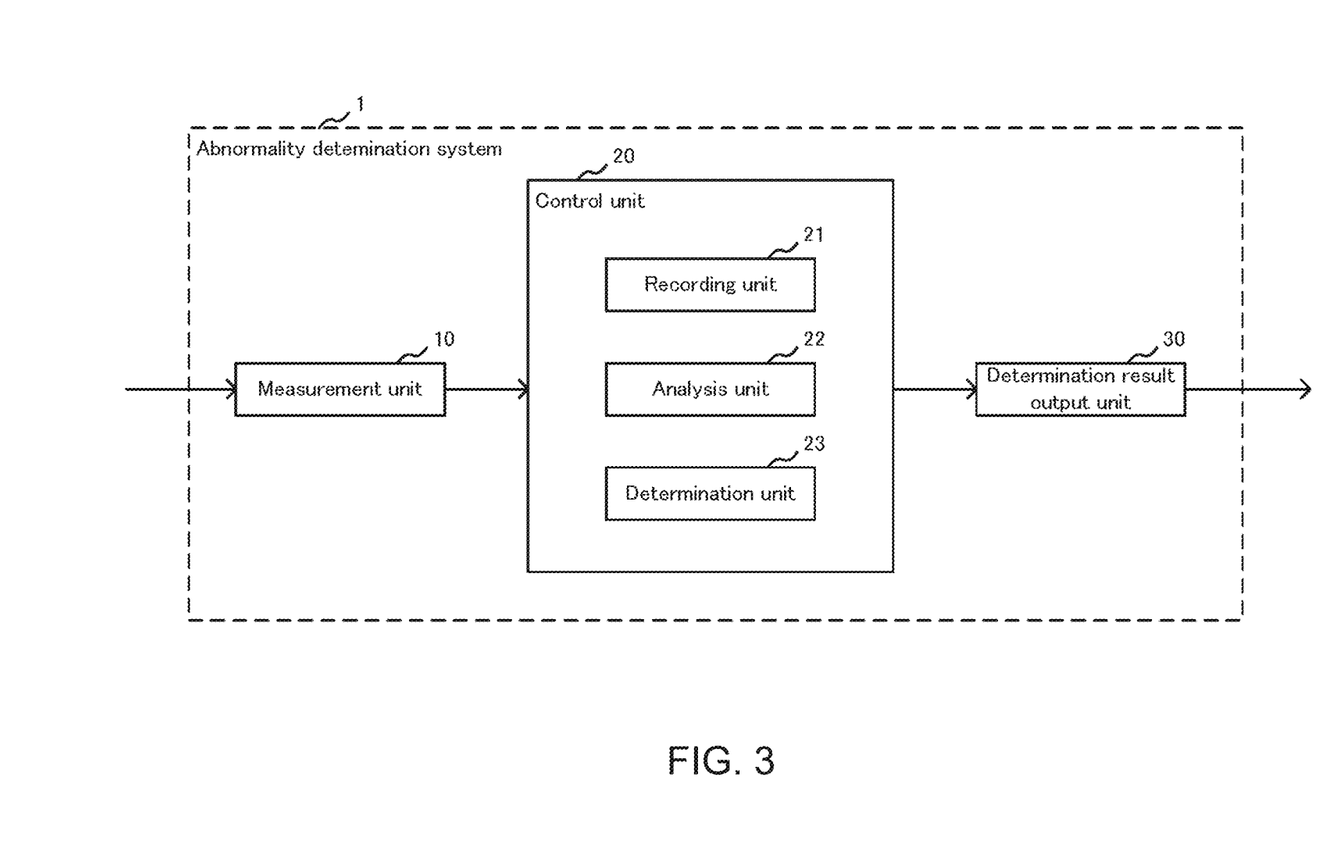
FIG. 3 is a block diagram illustrating a functional configuration of the abnormality determination system.

FIG. 3 is a block diagram illustrating a functional configuration of the abnormality determination system 1.

The abnormality determination system 1 is equipped with a measurement unit 10, a control unit 20, and a determination result output unit 30.

The measurement unit 10 (also known as an acoustic detector) measures the sound generated by the wind power generation device 2, converts the measured sound (analog signal) into a digital signal, and outputs acoustic data to the control unit 20. The measurement unit 10 is configured from a microphone and an A/D converter.

The microphone is not particularly limited, but it is preferable to use a directional microphone from the viewpoint of noise suppression. Further, in order to cope with a wide variety of defects, a microphone having wide frequency characteristics is preferably used.

There are no particular limitations on the A/D converter, but it is preferable to use an A/D converter having high (large) resolution (bit count) from the viewpoint of improving accuracy of analysis.

The control unit 20 is a processor that analyzes the acoustic data transmitted from the measurement unit 10, that determines whether there is an abnormality in the wind power generation device 2, and that is configured from a smartphone, a portable information terminal, a personal computer, or the like, that is equipped with hardware such as a central processing unit (CPU), a read-only memory (ROM) (non-transitory media), a random-access memory (RAM), a hard disk drive (HDD) (non-transitory media), and a communication interface.

The control unit 20 is equipped with a recording unit 21, an analysis unit 22, and a determination unit 23, and these units are controlled by a control program stored in the control unit 20.

The recording unit 21 is a recording unit that stores the acquired acoustic data, and is configured from a recording medium such as an HDD or a memory card.

The analysis unit 22 is a processor that reads and analyzes the acoustic data stored in the recording unit 21. The analysis unit 22 performs spectrogram analysis on the acoustic data on a frequency axis and in a temporal axis space as a temporal change in the frequency characteristic. Examples of the spectrogram analysis method include the short-time Fourier transform and the wavelet transform. The analysis result of the analysis unit 22 is outputted to the determination unit 23.

The determination unit 23 is a processor that determines the presence or absence of an abnormality of the wind power generation device 2. The determination unit 23 determines an abnormality in a case where a signal component greater than or equal to a predetermined threshold is detected on the basis of the analysis result of the analysis unit 22, and outputs the determination result to the determination result output unit 30. The blade 3 of the wind power generation device 2 exhibits a difference between the wind noise in a normal operation state and the wind noise in an abnormal state as a result of damage due to deterioration, a lightning strike, a flying object, or the like. It is preferable that acoustic data is acquired for wind noise in an abnormal state, and that the threshold value of the signal component of a characteristic sound when a blade 3 is damaged is configured based on the acquired data and the knowledge and so forth of an expert engaged in performing maintenance work on the wind power generation device 2.

The determination result output unit 30 outputs the determination result of the determination unit 23 to the user (the person performing measurement, the observer, or the like). The control unit 20 may be configured from a display device such as a screen display unit of a smartphone or a portable information terminal or a display of a personal computer, or may be configured from a communication interface that transmits a determination result to the remote monitoring device 7 via a communication network such as the Internet. In a case where the determination result is transmitted to the remote monitoring device 7, the determination result is displayed by the display device of the remote monitoring device 7, and is used for monitoring at a remote site or the like.

The microphone 5 illustrated in FIG. 1 corresponds to the measurement unit 10 illustrated in FIG. 3, and is disposed inside or around the wind power generation device 2. The abnormality determination device 6 illustrated in FIG. 1 corresponds to the control unit 20.

If the abnormality determination device 6 is a portable device such as a smartphone or a portable information terminal that is easy to carry, sound can also be collected around the outside of the wind power generation device 2 by using the microphone 5. In order to accurately detect an abnormality in the wind power generation device 2, the microphone 5 is preferably installed inside the wind power generation device 2 (for example, inside the nacelle 4).

If the abnormality determination device 6 is of the always-on monitoring type that continually monitors the operation status of the wind power generation device 2, the abnormality determination device is preferably installed in a structure to avoid wind and rain that is provided inside the nacelle 4 less affected by wind and rain, on the lower side of the outside of the nacelle 4, or outside the wind power generation device 2.

An example of the processing procedure of the abnormality determination system configured as described above will be described.

Figure 4:
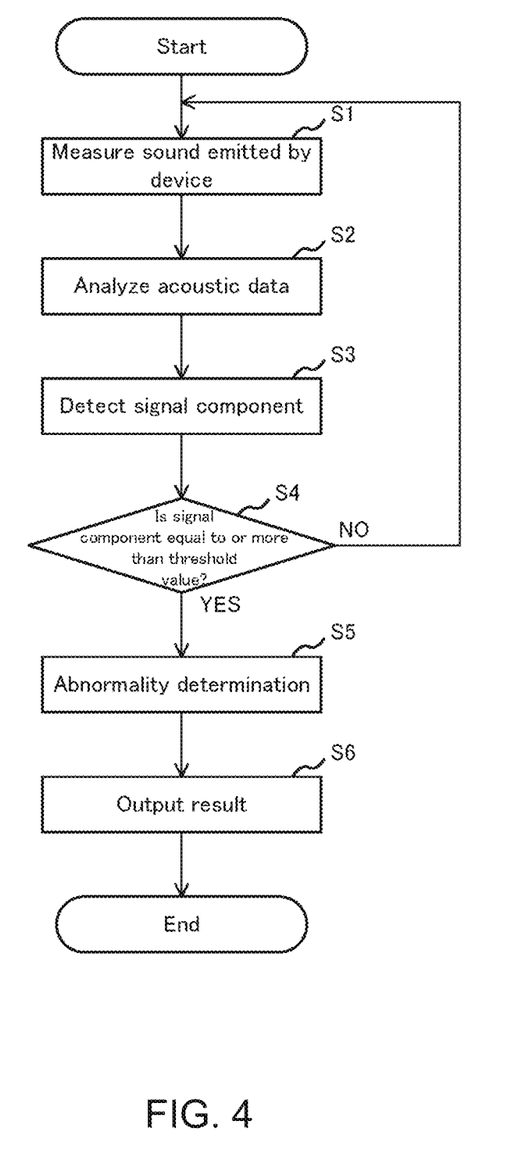
FIG. 4 is a flowchart illustrating a processing procedure of the abnormality determination system.

FIG. 4 is a flowchart illustrating a processing procedure of the abnormality determination system.

First, the measurement unit 10 measures sound emitted by the wind power generation device 2 (step S1). The measured sound is converted into a digital signal, and acoustic data is recorded in the recording unit 21.

Next, the analysis unit 22 executes an analysis of the acoustic data recorded in the recording unit 21 (step S2). The analysis unit 22 uses the short-time Fourier transform or the wavelet transform to perform spectrogram analysis on the acoustic data on a frequency axis and in a temporal axis space as a temporal change in the frequency characteristic. At such time, spectrogram analysis may be performed on the deviation data from the time-averaged spectrum of the measured sound, instead of the acoustic data.

Subsequently, the determination unit 23 detects, on the basis of the analysis result of the analysis unit 22, a signal component emitted from an abnormal portion in a time corresponding to the rotation of the wind power generation device 2 (step S3). At such time, the fast Fourier transform may be further performed on the analysis result of the analysis unit 22 to detect the signal component emitted from the abnormal portion with a frequency corresponding to the rotation speed of the wind power generation device 2.

If the signal component detected by the determination unit 23 is less than the predetermined threshold value (NO in step S4), the determination unit 23 determines that there is no abnormality and continues the acoustic measurement by the measurement unit 10 (returns to step S1).

If the signal component detected by the determination unit 23 is greater than or equal to the predetermined threshold value (YES in step S4), the determination unit 23 determines that an abnormality has occurred in the wind power generation device 2 (step S5).

Thereafter, the determination result output unit 30 outputs the determination result (step S6) to notify the user of the state in which the abnormality occurs in the wind power generation device 2, whereupon the processing procedure of the abnormality determination system 1 ends.

Thus, with the abnormality determination system for a wind power generation device according to the embodiment, the presence or absence of an abnormality is determined by measuring sound emitted by the wind power generation device 2, performing spectrogram analysis on the corresponding acoustic data on a frequency axis and in a temporal axis space as a temporal change in a frequency characteristic, and detecting a signal component emitted from an abnormal portion in a time corresponding to rotation of the wind power generation device 2. Therefore, an abnormality of the wind power generation device 2 can be detected at an early stage, and an abnormality of the wind power generation device 2 can be reliably detected even by a non-expert.

Hereinafter, Examples of the present invention will be described. Note that the present invention is not limited to or by these Examples.

Figure 5:
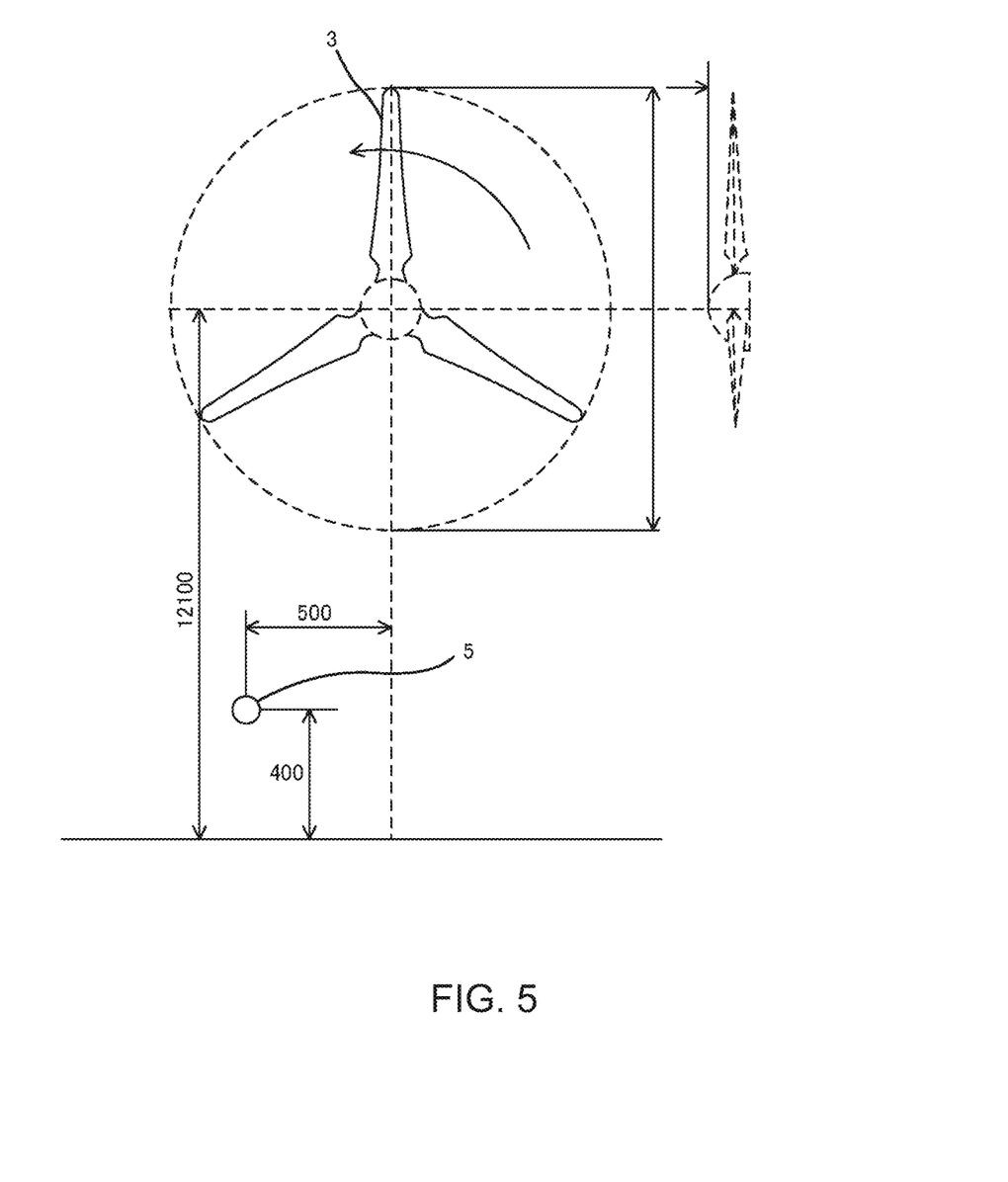
FIG. 5 is a diagram illustrating a wind power generation device (wind turbine) used in an Example.

FIG. 5 is a diagram illustrating a wind power generation device (wind turbine) used in an Example.

Figure 6:
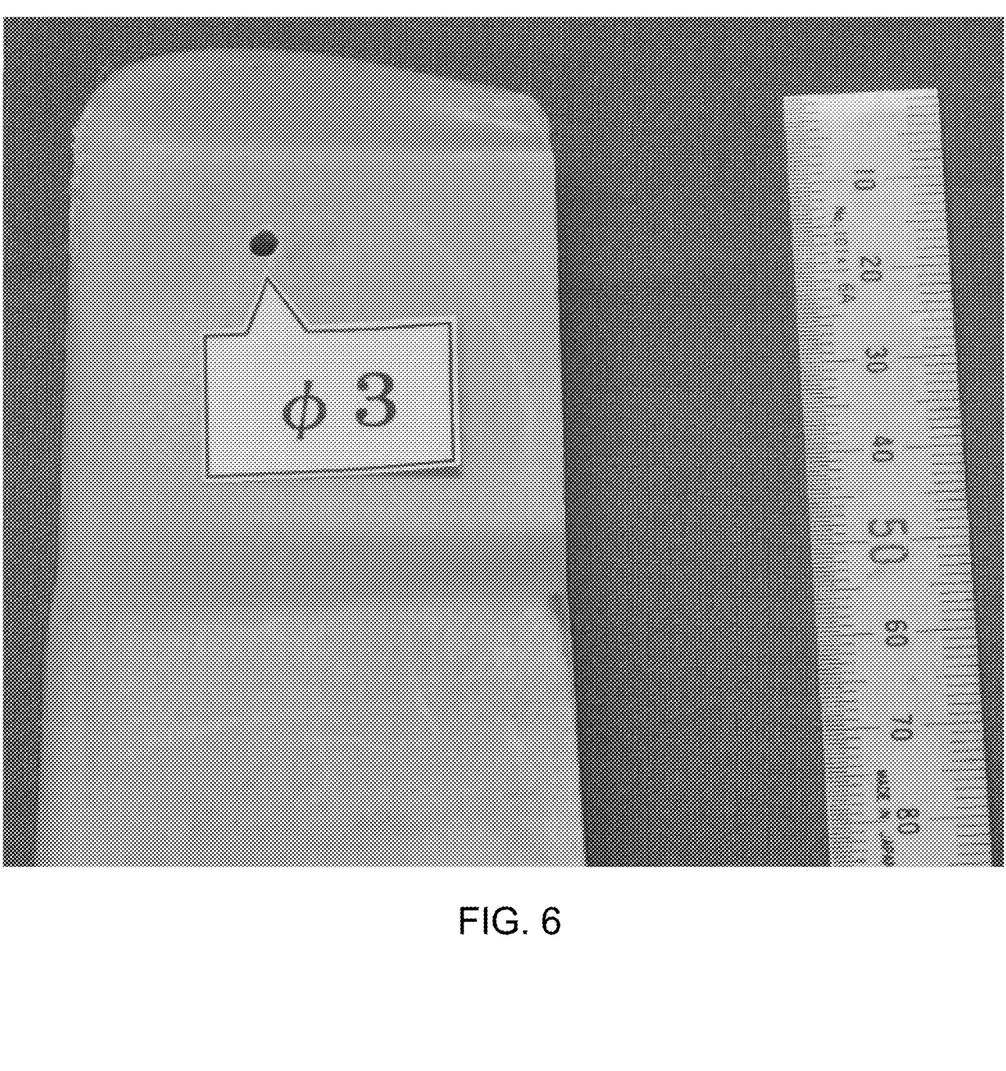
FIG. 6 is a diagram illustrating simulated defects of a blade used in the Example.

Further, FIG. 6 is a diagram illustrating simulated defects of a blade used in the Example.

Example 1

A through-hole of Φ3 was formed as a simulated defect in the tip portion of a blade 3 having a diameter of Φ1300 (for Air Dragon AD-600 manufactured by Digimax), the blade 3 was attached to a drive motor (a three-phase motor TFO-LK-4P), having its rotation speed controlled by a general-purpose inverter (SC-075), and was rotated at a rotation speed of 600 rpm so as to match the peripheral speed of a large wind turbine. Acoustic measurement was performed by using a microphone 5 (ECM-SP-10) and a data recorder (TASCAM DR-100mkIII). As illustrated in FIG. 5, the blade 3 was installed at a position where the height of the rotating shaft of the blade 3 was 12100 mm, and the microphone 5 was installed in a position at a height of 400 mm above the ground, which is a position offset by 20 mm from the inside of the rotating surface of the blade 3, directly below the rotating shaft.

Spectrogram analysis was performed on the recorded sound by using the short-time Fourier transform. An example of the signal component detected as the analysis result is illustrated in FIG. 7.

Figure 7:
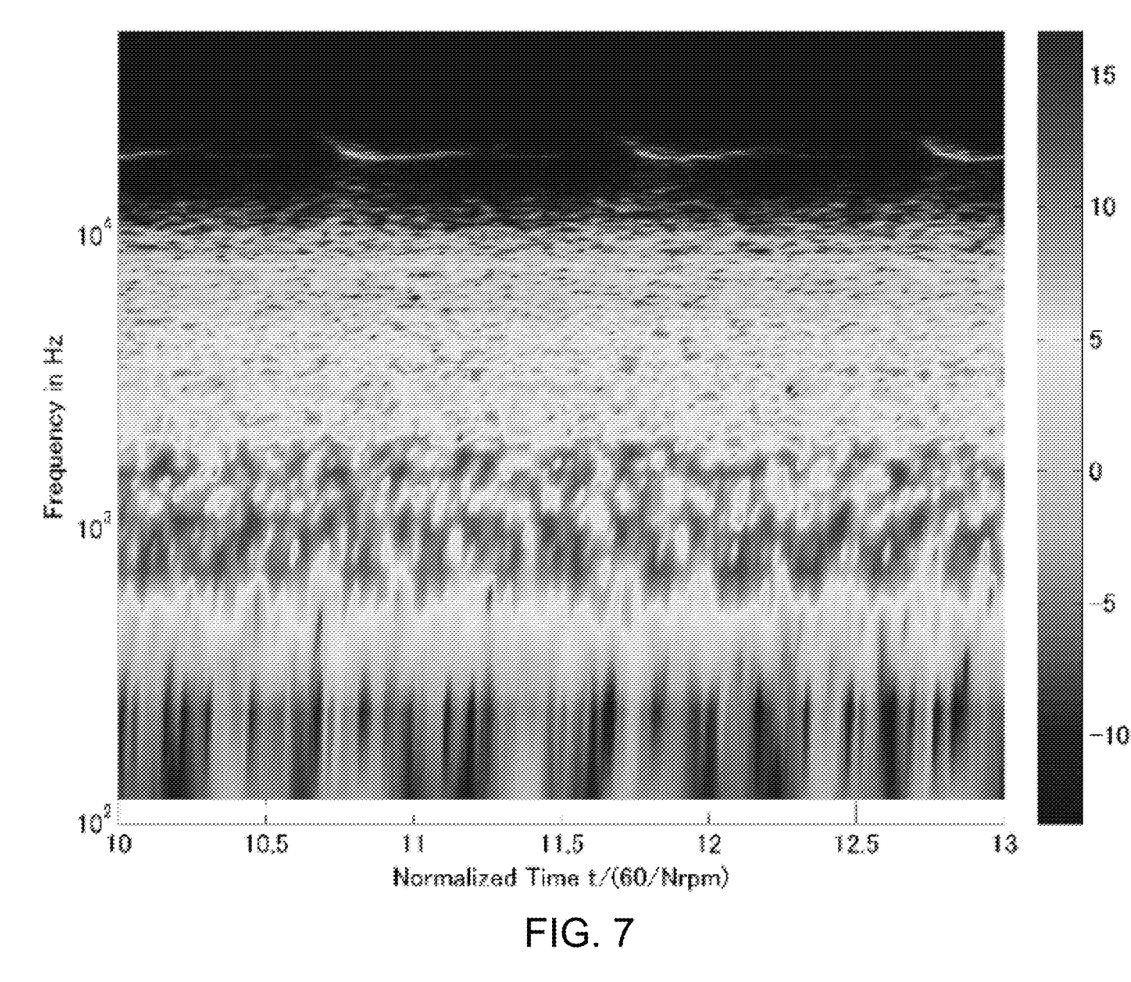
FIG. 7 is a diagram illustrating an example of a frequency-time analysis result (with abnormality).

FIG. 7 is a diagram illustrating an example of a frequency-time analysis result (with abnormality).

The horizontal axis represents time, and the vertical axis represents a frequency and levels are indicated using colors. A warm color indicates a high level, and a cool color indicates a low level. It can be seen that a signal derived from the simulated defect is detected at around several 10 kHz. Note that a signal of 10 kHz or less is operation noise of a motor or the like.

Comparative Example

The same measurement and analysis were performed under the same conditions as in Example 1 except that a blade 3 was used which was not provided with a through-hole as a simulated defect in the tip portion. An example of the signal component detected as the analysis result is illustrated in FIG. 8.

Figure 8:
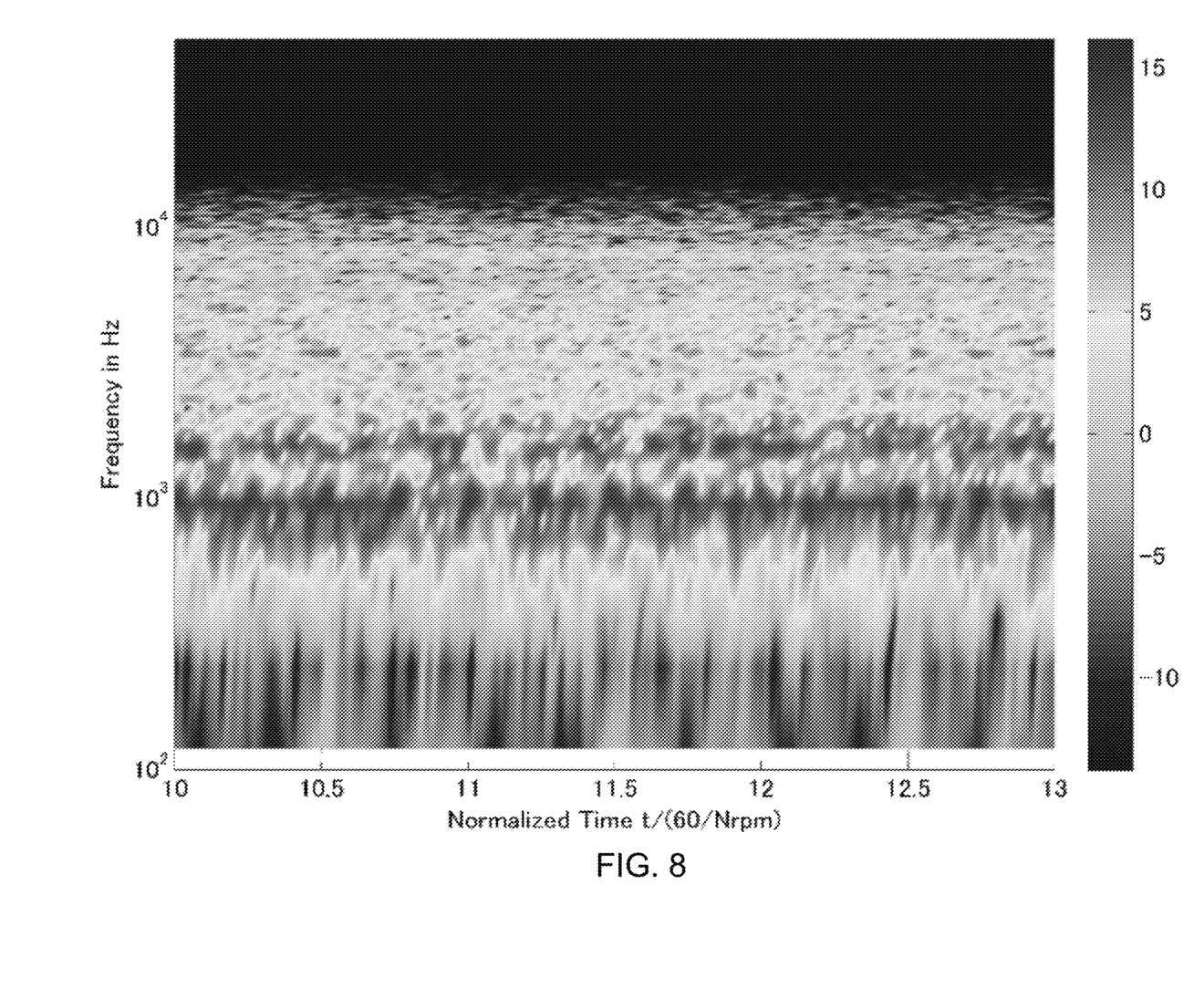
FIG. 8 is a diagram illustrating an example of a frequency-time analysis result (without abnormality).

FIG. 8 is a diagram illustrating an example of a frequency-time analysis result (without abnormality).

Due to this configuration, it can be seen that a signal derived from operation noise of a motor or the like of 10 kHz or less is detected, but no signal is detected around several 10 kHz.

Example 2

Example 2 differs from Example 1 in that deviation data from the time-averaged spectrum of the recorded sound was used, and the other points were analyzed in the same manner as in Example 1. An example of the signal component detected as the analysis result is illustrated in FIG. 9.

Figure 9:
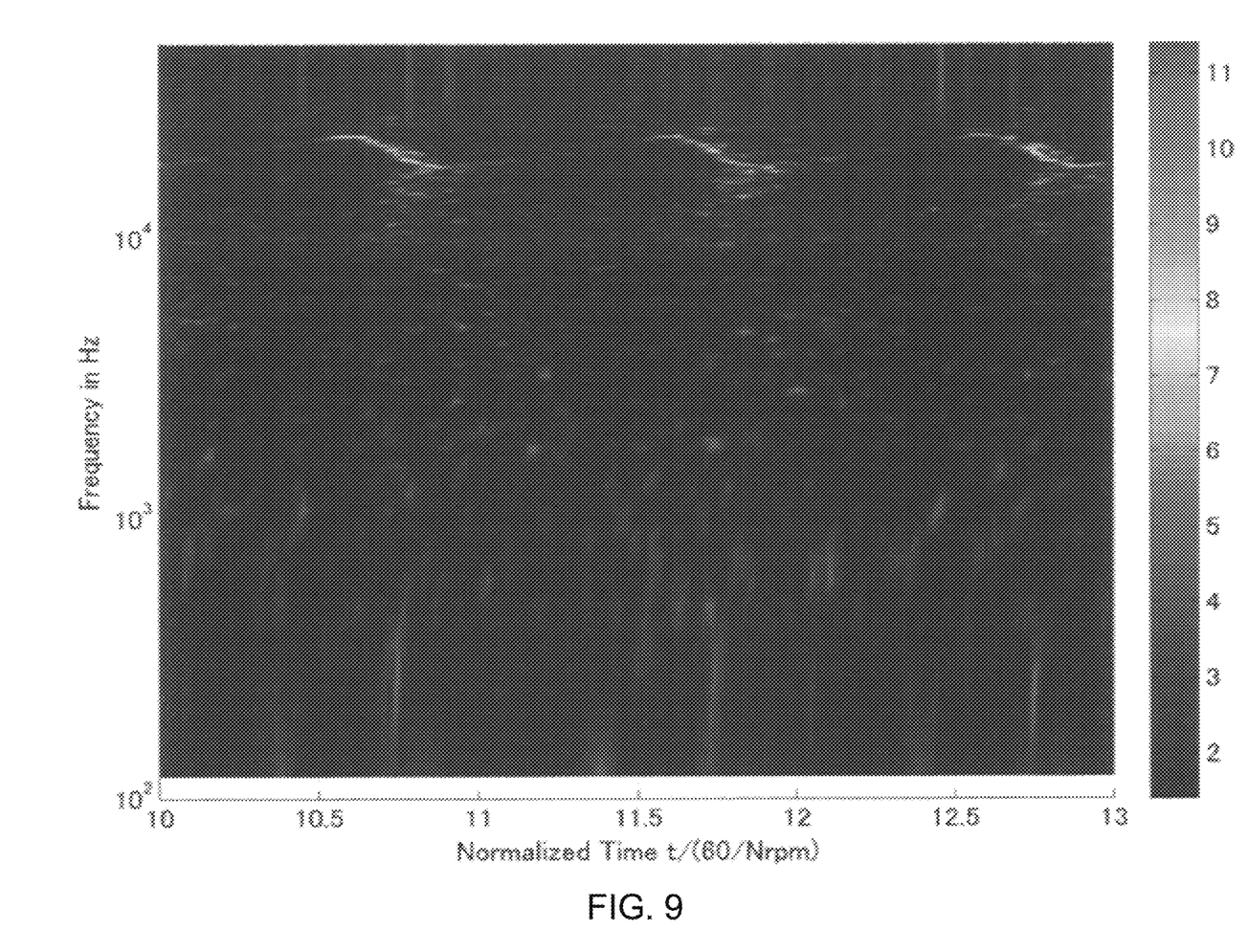
FIG. 9 is a diagram illustrating an example of a frequency-time analysis result (with abnormality) obtained by analyzing a deviation from a time-average spectrum.

FIG. 9 is a diagram illustrating an example of a frequency-time analysis result (with abnormality) obtained by analyzing a deviation from a time-average spectrum.

Due to this configuration, it can be seen that the operation noise of the motor and the like is eliminated, and only the signal derived from the simulated defect is detected.

Example 3

Example 3 differs from Example 2 in that the fast Fourier transform was implemented after the spectrogram analysis was performed; otherwise the same analysis was performed as in Example 2. An example of the signal component detected as the analysis result is illustrated in FIG. 10.

Figure 10:
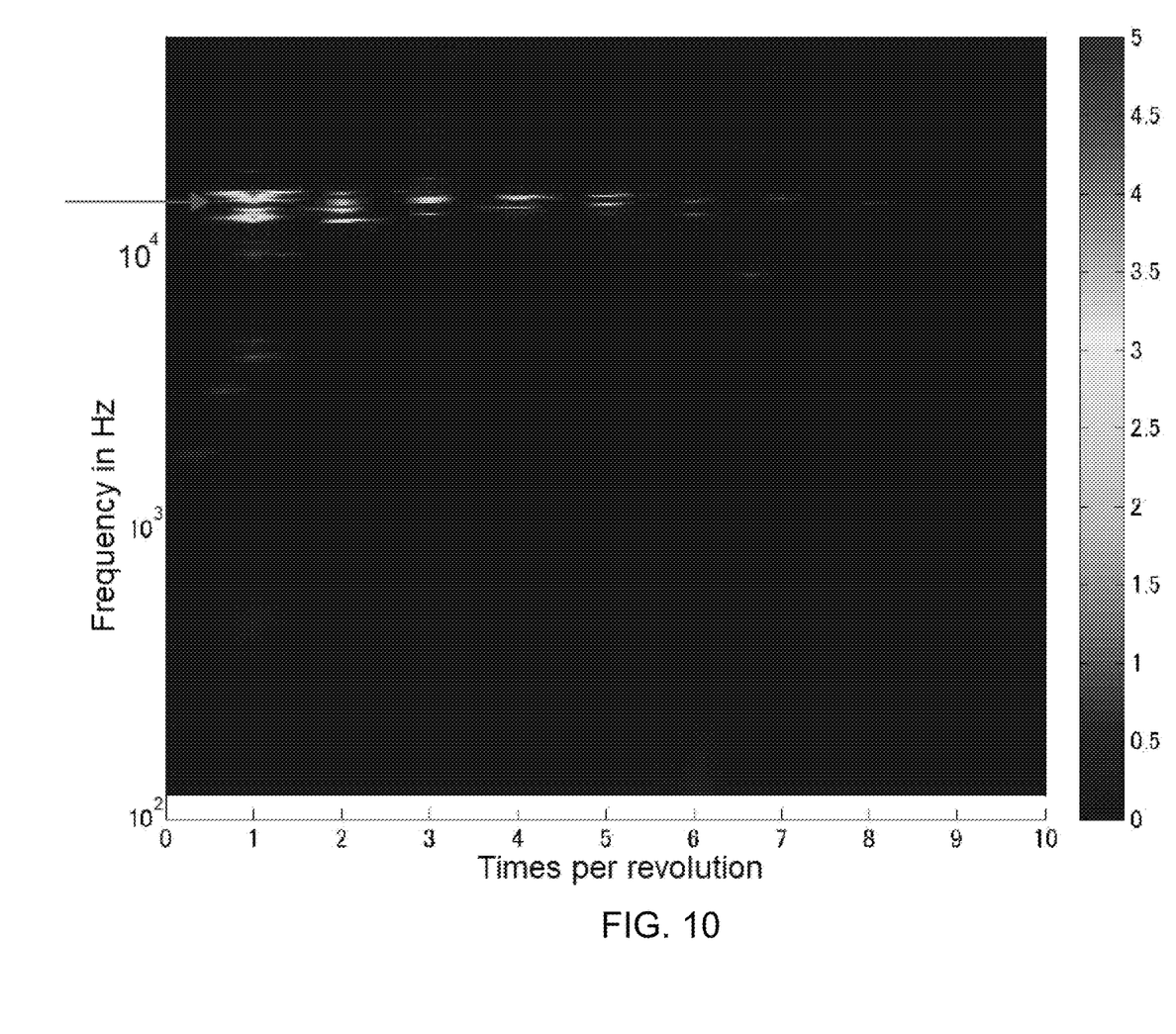
FIG. 10 is a diagram illustrating an example of a frequency-time analysis result (with abnormality) obtained by implementing the fast Fourier transform.

FIG. 10 is a diagram illustrating an example of a frequency-time analysis result (with abnormality) obtained by implementing the fast Fourier transform.

Due to this configuration, it can be seen that a signal derived from the simulated defect is detected in a location corresponding to the rotation of a propeller.

As described hereinabove, the presence or absence of an abnormality is determined by measuring sound emitted by the wind power generation device, performing spectrogram analysis on the corresponding acoustic data on a frequency axis and in a temporal axis space as a temporal change in a frequency characteristic, and detecting the signal component emitted from a portion where a defect is generated in a time corresponding to rotation of the wind power generation device. Therefore, an advantageous effect is afforded whereby an abnormality, such as deterioration or damage occurring in the wind power generation device, can be detected at an early stage. In addition, because an abnormality of the wind power generation device is detected by measuring the sound emitted by the wind power generation device, an advantageous effect is afforded whereby an abnormality of the wind power generation device can be reliably detected even by a non-expert.

Although the abnormality determination method of the wind power generation device according to the present invention has been described hereinabove based on an embodiment, the present invention is not limited thereto. Various design changes can be made within a scope enabling the object of the present invention to be achieved and without departing from the gist of the invention, and all of such changes are included within the scope of the present invention.

For example, although a propeller-type wind turbine was described with illustrations in the foregoing embodiment, the abnormality determination method of the wind power generation device according to the present invention may also be applied to a wind turbine other than a propeller-type wind turbine.

INDUSTRIAL APPLICABILITY

The abnormality determination method for a wind power generation device according to the present invention is suitable for detecting an abnormality of a wind power generation device such as a wind turbine, and is useful as a part of a maintenance system for the wind power generation device.

REFERENCE SIGNS LIST 1 abnormality determination system
2 wind power generation device
3 blade
4 nacelle
5 microphone
6 abnormality determination device
7 remote monitoring device
10 measurement unit
20 control unit
21 recording unit
22 analysis unit
23 determination unit
30 determination result output unit
41 variable pitch mechanism
42 speed booster
43 brake device
44 generator
45 control and power-supply hydraulic device
46 yaw drive mechanism

The invention claimed is:

1. An abnormality determination method for a wind power generation device, comprising:
    measuring sound emitted by the wind power generation device as acoustic data using an acoustic detector and recording the acoustic data in computer memory;
    creating, based on the acoustic data recorded using a computer processor, deviation data from a time-averaged spectrum of the recorded acoustic data, and performing a spectrogram analysis on the deviation data, on a frequency axis and in a temporal axis space as a temporal change in a frequency characteristic by using the short-time Fourier transform or the wavelet transform;
    detecting using the computer processor, from the analysis result in the analysis step, only a signal component emitted from an abnormal portion of the wind power generation device in a time corresponding to rotation of the wind power generation device; and
    determining, using the computer processor that the wind power generation device is abnormal when the signal component detected in the detection step is greater than or equal to a certain threshold value, and the acoustic detector ceases measuring sound emitted by the wind power when in the abnormal state.

2. The abnormality determination method for a wind power generation device according to claim 1,
    wherein the fast Fourier transform is implemented after performing the spectrogram analysis in the analysis step, and
    wherein, detecting only the signal component comprises detecting, only a signal component emitted from an abnormal portion of the wind power generation device with a frequency corresponding to a rotation speed of the wind power generation device is detected from an analysis result after implementing the fast Fourier transform.

3. The abnormality determination method for a wind power generation device according to claim 1,
    wherein the sound emitted by the wind power generation device measured in the measurement step is blade wind noise, and
    wherein, determining that the wind power generation device is abnormal comprises detecting that a blade is abnormal when the signal component detected in the detection step is greater than or equal to a threshold value that is configured based on the signal component of a characteristic sound when a blade is damaged.

4. The abnormality determination method of claim 1, wherein the acoustic detector comprises a microphone.

5. An abnormality determination system for a wind power generation device, comprising:
    an acoustic detector that measures sound emitted by the wind power generation device and records acoustic data;
    a computer processor that:
        i. creates, based on the recorded acoustic data, deviation data from a time-averaged spectrum of the recorded acoustic data, and performs a spectrogram analysis on the deviation data, on a frequency axis and in a temporal axis space as a temporal change in a frequency characteristic by using the short-time Fourier transform or the wavelet transform;
        ii. detects, from the analysis result of the analysis means, only a signal component emitted from an abnormal portion of the wind power generation device in a time corresponding to rotation of the wind power generation device; and iii. determines that the wind power generation device is abnormal when the signal component detected by the detection means is greater than or equal to a certain threshold value, and ceases the acoustic detector from measuring sound emitted by the wind power when in the abnormal state.

6. The abnormality determination system of claim 5, wherein the acoustic detector comprises a microphone.

7. The abnormality determination system of claim 6, wherein the microphone comprises an analog to digital (A/D) converter.

8. The abnormality determination system of claim 5, further comprising computer memory in which acoustic data is stored.

9. A computer program stored in non-transitory medium for an abnormality determination device in an abnormality determination system for a wind power generation device, the computer program executable on a computer to execute:

measuring sound emitted by the wind power generation device as acoustic data using an acoustic detector and recording the acoustic data in computer memory;

creating, based on the acoustic data recorded using a computer processor, deviation data from a time-averaged spectrum of the recorded acoustic data, and performing a spectrogram analysis on the deviation data, on a frequency axis and in a temporal axis space as a temporal change in a frequency characteristic by using the short-time Fourier transform or the wavelet transform;

detecting using the computer processor, from the analysis result in the analysis step, only a signal component emitted from an abnormal portion of the wind power generation device in a time corresponding to rotation of the wind power generation device; and determining, using the computer processor, that the wind power generation device is abnormal when the signal component detected is greater than or equal to a certain threshold value, and ceases the acoustic detector from measuring sound emitted by the wind power when in the abnormal state.

10. The computer program stored in non-transitory medium of claim 9, wherein the acoustic detector comprises a microphone.

11. The computer program stored in non-transitory medium of claim 10, wherein the microphone comprises an analog to digital (A/D) converter.

\* \* \* \* \*